Aug. 28, 1951  C. W. EARP ET AL  2,565,485
RADIO NAVIGATION SYSTEM
Filed April 12, 1947  4 Sheets-Sheet 1
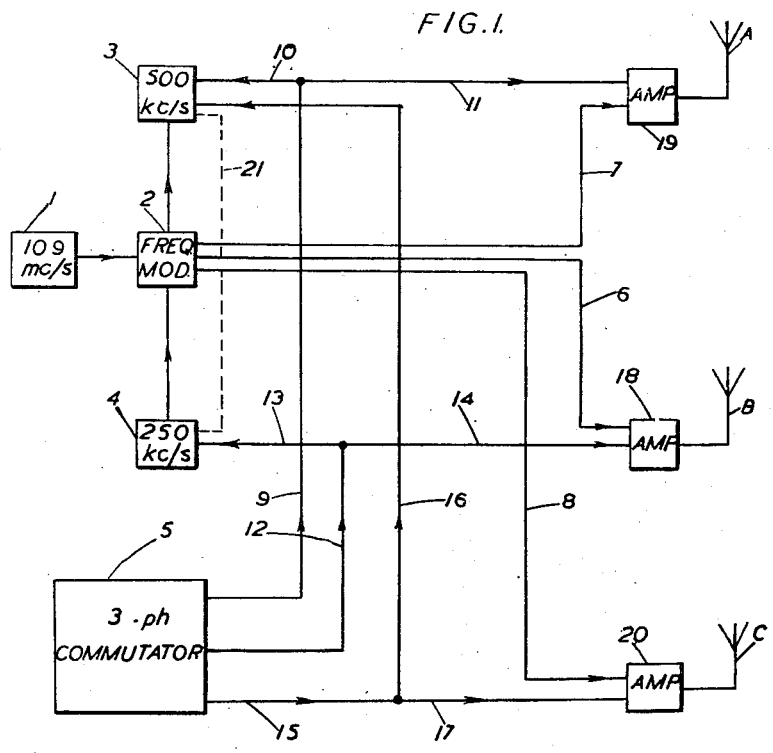
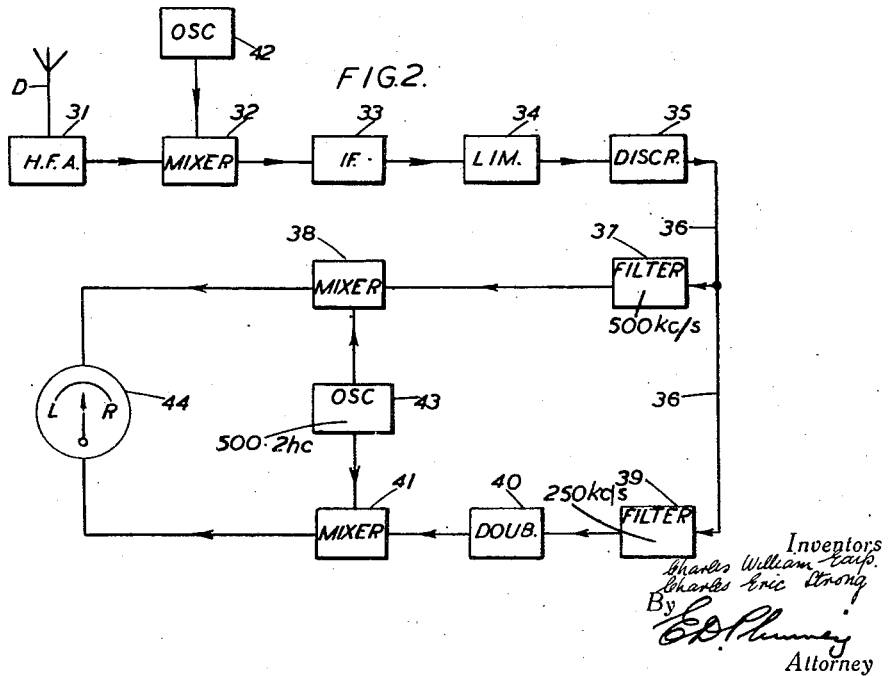

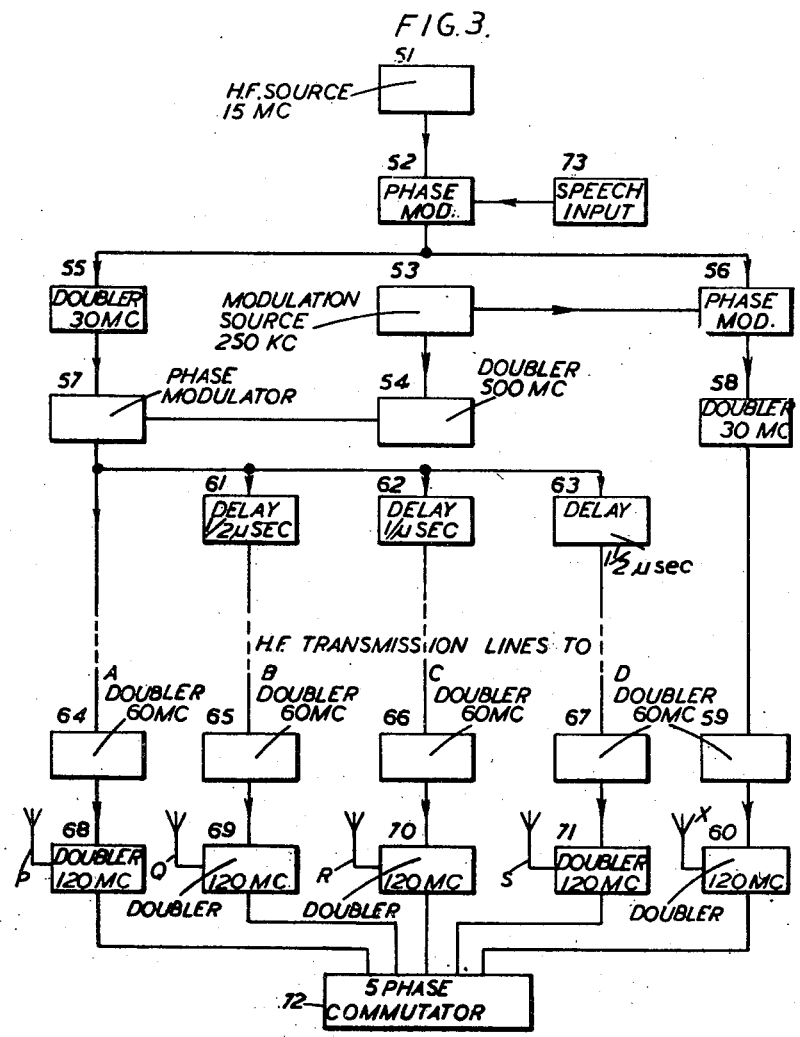

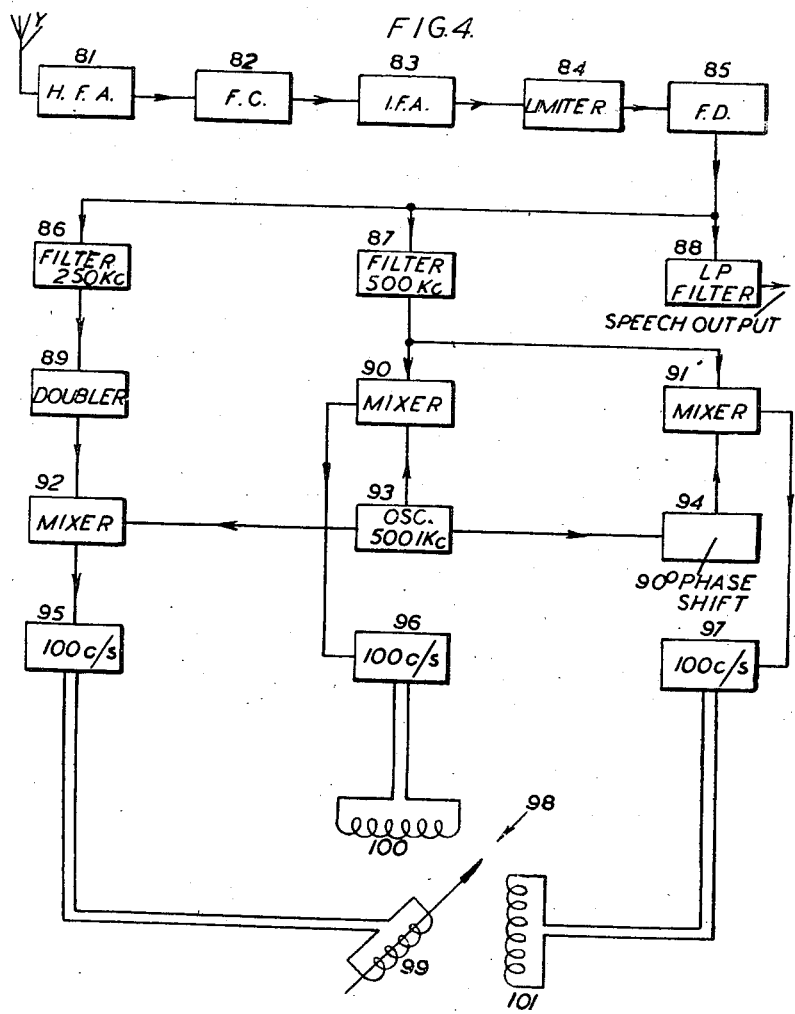

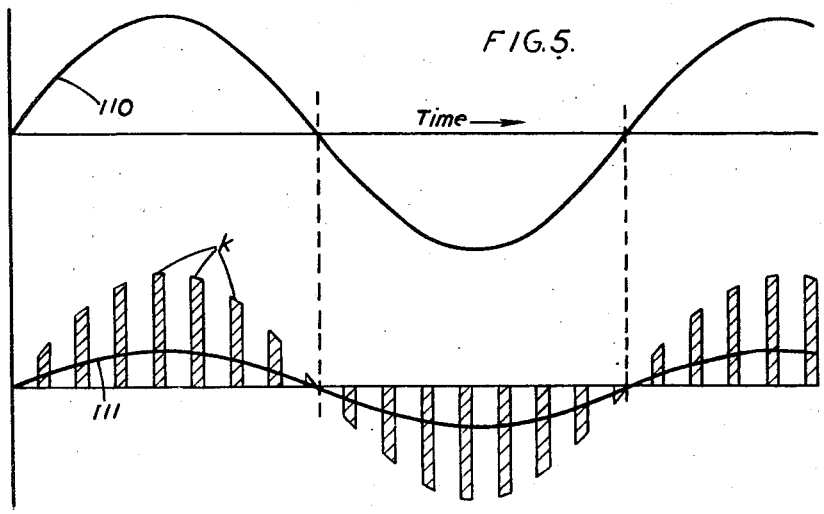
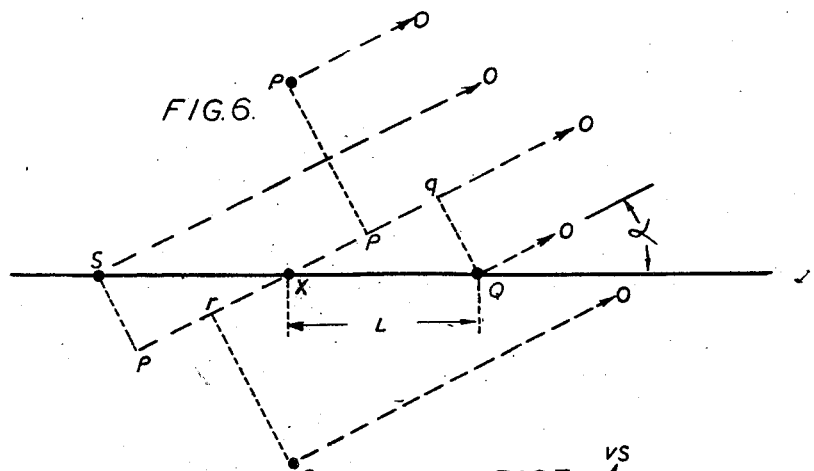
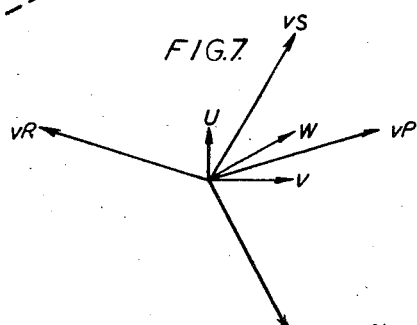
Inventors
Charles William Earp
Charles Eric Strong
By
Attorney

UNITED STATES PATENT OFFICE 2,565,485

RADIO NAVIGATION SYSTEM

Charles William Earp and Charles Eric Strong, London, England, assignors to International Standard Electric Corporation, New York, N. Y.

Application April 12, 1947, Serial No. 741,084
In Great Britain February 5, 1946

Section 1, Public Law 690, August 8, 1946
Patent expires February 5, 1966

14 Claims. (Cl. 343—105)

This invention relates to radio navigation systems, and in particular it relates to radio navigation systems of the type in which the navigational information is obtained on a mobile station from a beacon station established for that purpose.

Radio navigation systems according to the prior art have been based on the setting up in space of radiation amplitude patterns of a directive character, and the navigational information has been derived either directly from changes in the intensity of the observed signal as the pattern is caused to rotate or otherwise change its position in space, or from a comparison of the signal intensities derived from overlapping patterns. In such cases it has been usual to modulate the aerial energising currents in order both to facilitate perception of the signal and to give identification of the pattern. Such modulation has been at audio frequency, and, apart from serving to identify the patterns and to enable the signals received from different patterns to be separated by note filters, has not in itself been a direct factor in conveying navigational information, the latter being definitely determined by the radiation pattern alone.

The efficacy of such beacon has therefore been dependent on (a) the degree of success in setting up the desired amplitude radiation pattern, and (b) the degree of success in observing the relative intensities of the signals received by the mobile station from these patterns.

It has been found in practice, however, the considerable difficulty is encountered in setting up the desired radiation patterns, and in maintaining them when once set up. This is largely due to reflections from ground irregularities and obstructions in the vicinity of the beacon. Moreover, the pattern set up is critically dependent on the spacing and power and phase energisation of the unit aerials comprised in the beacon array, and the determination of the correct spacing and operating conditions may in itself present difficulties, particularly when the operating wavelength is small, since the spacing between the aerial units is of the same order as the wavelength of radiation. While the position of reflection points arising from ground conditions may remain unchanged, the amplitude of the reflection and its effect on the radiation pattern may vary appreciably with weather conditions and with the difference between summer and winter vegetation, necessitating frequent readjustment of the beacon; while the reflections due to movable objects may give rise to serious short period aberrations in the beacon performance, such as shifting of a course, change in width of a beam, or even the appearance of false courses.

It has also been found that on the mobile station correct observation of the relative intensities of the signals arising from the various radiation patterns set up by a particular beacon is rendered difficult by interference from other and perhaps more distant beacons operating on the same or closely adjacent wavelengths, even although that interference is weak. If beacon signals were modulated in respect not of amplitude but of angular velocity, i. e. were phase or frequency modulated, then the strong signal from a nearby beacon would "capture" the receiver and make it irresponsive to all other signals the intensity of which was more than about 6 db below that of the local desired signal. It is however impossible to use phase or frequency modulation in the known types of beacon now under consideration, since with such modulation the detected signal would be of the same strength at all points in space, and there would be no means of assessing the relative intensities of different radiation patterns by means of the amplitude of the detected signal.

It is therefore an object of this invention to provide a radio navigation system which will not involve highly critical adjustment of aerial energising current.

A further object of the invention is to provide a radio navigation system which shall exhibit a high degree of immunity from instability of course indication and from false courses due to reflections of the radiant energy from ground irregularities, etc.

A still further object of the invention is to provide a radio navigation system which will enable the "capture effect" which is possible with angular velocity modulation, i. e. with phase or frequency modulation to be utilised, and so permit effective guidance to be maintained under conditions of geographical proximity of stations and proximity of their operating frequencies which would otherwise make guidance impossible owing to intolerable interference.

A still further object of the invention is to provide a radio navigation system the radiation frequency of which may be changed within wide limits without entailing readjustment of aerial spacing in order to maintain unaltered the guidance indications.

According to its most general aspect, the invention provides a radio navigation system comprising at a beacon station means for setting up in space one or more polar patterns of phase difference between a plurality of envelopes of modulation, each of said envelopes of modulation characterising the radiation from respective ones of a plurality of spaced aerial systems, and at a mobile station means for observing the said polar patterns of phase difference and means for deriving navigational information therefrom.

According to another general aspect the invention provides a radio navigation system comprising at a beacon station a plurality of spaced aerials, means for radiating distinguishable modulation frequencies from the respective aerials, and means at a receiver for comparing the phases of said modulation frequencies to give navigational information, which information is dependent on the spacing of the aerials as a function of the modulation frequency.

More particularly, the invention provides a radio beacon transmitter comprising a plurality of spaced aerials, means for feeding each said aerial with high frequency energy, and means for modulating in predetermined frequency and phase the energy fed to respective ones of said aerials in such manner as to set up polar patterns of phase difference between the envelopes of modulation frequency. Preferably, at least on of the said means for modulating comprises an angular-velocity modulator i. e. a frequency modulator or a phase modulator. Means may further be provided for superimposing message signals on the beacon transmission.

The invention further provides a radio beacon receiver system comprising means for receiving modulated electromagnetic waves, means for demodulating said waves, means for selecting demodulation products of predetermined frequency, and means responsive to the phase relationships between said selected demodulation products whereby an indication is obtained of the bearing of said receiver relative to the source of said electromagnetic waves. Means may also be provided for selecting demodulation products corresponding to message signals.

The physical basis of the invention is the effect of propagation time on a modulated wave in causing a change of phase not only in the carrier but also in the envelope of modulation. For the carrier alone the magnitude of this change is given by $$2\pi \frac{fd}{c} \text{ radians}$$

where $f$ is the carrier frequency, $d$ the distance through which the wave has been propagated, and $c$ the velocity of propagation. For the envelope of modulation the phase change is given by $$2\pi F \frac{d}{c}$$

where $F$ is the modulation frequency. Since $F$ is always smaller than $f$, the phase change for a given distance of propagation is much less pronounced in the case of the envelope of modulation than in the carrier alone.

A simple embodiment of the invention consists in a two aerial system as follows; Reference characters being used merely to facilitate understanding. Omnidirectional aerials M and N are spaced apart $s$, and are energised alternately at the same wavelength and amplitude, the exciting currents being modulated with the same frequency and phase of modulation.

At any point O in space alternate fields will be received from the two alternately energised aerials, differing in phase characteristics in correspondence with the difference in length from O to each of the aerials. If O is sufficiently distant from the lines joining O to M and N to be substantially parallel, the difference in length between the two paths is approximately $s \cos a$, where $a$ is the angle made by the direction of O with the line joining M and N. Assuming that amplitude modulation is used, and that M is the nearer of the two aerials to O, the fields set up at O due to M and N may be represented respectively by $E_M$ and $E_N$, with $$E_M = k \sin(2\pi ft + \theta)[1 + K \sin(2\pi Ft + \varphi)]$$

$$E_N = k \sin\left(2\pi ft + \theta - \frac{2\pi s \cos a}{\lambda_f}\right)\left[1 + K \sin\left(2\pi Ft + \varphi - \frac{2\pi s \cos a}{\lambda_F}\right)\right]$$

where $k$ is a constant depending on the radiated power, $\theta$ and $\varphi$ are phase constants, $f$ and $\lambda_f$ the frequency and wavelength of the carrier wave, $F$ and $\lambda_F$ the frequency and wavelength of the modulation wave, and $K$ the depth of modulation.

The demodulated output from a receiver at O will correspond alternately to envelopes of $E_M$ and $E_N$, and will comprise alternate waves of the same modulation frequency $F$, but differing in phase by $$\frac{2\pi s \cos a}{\lambda_F}$$

Phase comparison of the receiver output waves will therefore give a measure of $a$, the bearing of the point O relative to the beacon aerials. In practice, for this phase difference to be easily measurable, the spacing of the aerials, $s$ must be of the same order as the modulation wavelength $\varphi_F$; with small spacing, and particularly with spacing of the order of the wavelength of radiation $\lambda_f$, large changes in $a$ may produce changes in the phase difference which are too small to be noted without using excessively complicated and delicate comparison apparatus.

It is an important aspect of this invention that the beacon information is derived solely from the phase difference between signals resulting from demodulation of the received high frequency wave. The phase of the carrier component is not used as such at any time, and the two modulated signals from M and N need not necessarily have the same carrier amplitude or same depth of modulation, or even be on the same radiating wavelength. What is necessary is that there should be some means whereby the envelope of the wave radiated from M can be clearly separated from the envelope of the wave radiated from N. In the example now being described the required separation is obtained by energising the two aerials alternately, i. e. by setting up two modulation channels distributed in time; identification of the channels thus separated may be obtained by imposing on the two channels different auxiliary distinguishing signals, such as for example low frequency modulation tones extending each throughout the duration of the corresponding channel, or pulses of different amplitude or width transmitted at the beginning of each channel period, the response of the receiver for these distinguishing signals being used to switch the output wave having directional significance to the appropriate terminals of the phase comparison device. The separation may also be obtained with continuous energisation of both aerials by setting up two channels on the same modulation frequency $F$ but on different radiation carrier frequencies; i. e. by distribution in the radiation frequency spectrum, receiving on a multi-wavelength-channel receiver.

Another important aspect of the invention is that the effect of reflections from ground irregularities, etc., is greatly reduced as compared with their effect on beacons which utilise the polar pattern of amplitude of radiation. A reflection sufficiently large to modify the radiation pattern to a serious extent can arise only from some ground irregularity, etc., in the proximity of the aerial, and the time delay of the reflection due to its longer path will correspond to something of the same order as the radiated wavelength. This delay may be quite enough to cause the reflected field to be in opposition for the direct field and seriously weaken it; but it will be a smaller fraction of the period of the modulation wave, the envelope of which will accordingly be very little altered.

A further important aspect of this invention is that the type of modulation used does not directly affect the derivation of the beacon information. In the present example it has been assumed that amplitude modulation will be used at the beacon, and ordinary demodulation at the receiver. The delay in the envelope of modulation is, however, the same for all types of modulation, and angular velocity modulation, i. e. phase or frequency modulation may likewise be used provided only that the mobile receiver is arranged for phase or frequency modulation. The use of this type of modulation moreover presents a great indirect advantage, in that by virtue of the "capture effect" inherent in such modulation, the radio interference from neighbouring beacons and from other sources is greatly reduced, and it is possible to operate a beacon network with closer geographical and wavelength spacing than could otherwise be done. For this reason the use of frequency or phase modulation is to be preferred.

The two aerial arrangement outlined above may be used as a homing beacon by any mobile equipment with suitable non-directional receiving and demodulating means, and with means for measuring the phase difference $$\frac{2\pi s \cos \alpha}{\lambda_F}$$

between the two envelopes of modulation. All that is necessary is that the mobile shall navigate so that the observed phase difference is held constant. The phase difference may be measured by any convenient means, such as, for example, the use of a dynamometer type phase-meter, or by display on a cathode ray oscillograph in accordance with well known technique.

Another application of the same arrangement is as a course beacon for radio range or localiser purposes, in which the purpose of the beacon is to guide a mobile along a pre-set course. In this application it is necessary for the mobile to navigate so that the observed phase difference between the two received modulation envelopes is held constant at a preassigned value. What this pre-assigned value should be will depend on the bearing of the course relative to the line through the beacon aerials, on the spacing between the aerials in wavelengths of modulating frequency, and on the phases of the envelopes of modulation at the two aerials. For example, in the simple case under discussion, there will be zero phase difference between the received envelopes along a course normal to the line through the beacon aerials and central between the aerials, since along this course the propagation distances are of the same length from O to the two aerials, and the latter have the same phase of envelope of modulation. An alternative arrangement is to provide that the envelopes of modulation are 180° out of phase at the aerials in which case the phase difference along the central course line just referred to will be 180°. If desired, a course line corresponding to a given observed phase difference on the mobile may be changed by altering the phase of the envelopes of modulation at the aerials, the lag of phase at aerial N being made equal to the difference between the assigned phase difference to be observed and the phase lag $$\frac{2\pi s \cos \alpha}{\lambda_F}$$

where $\alpha$ is the angle of the course relative to the line through the aerials. If desired, additional course lines may be made available from the same two aerials by modulating the radiant energy at more than one frequency, the phasing of each modulating frequency being chosen according to the bearing of the related course line.

While the outline of the foregoing simple embodiments of the invention has been based on the use of omnidirectional aerials, it is obvious that if it is desired to give beacon signals over only a limited arc the omnidirectional aerials may be replaced by arrays of any kind which will concentrate the radiation in the desired direction. In such case the spacing of the elements of the array will be determined as a function of the radiation frequency, but the spacing between arrays will be determined as before with reference to the modulation frequency, and the overall phasing of the modulation envelope at each array will be determined by the requirements with respect to the phase difference to be observed at the mobile.

While the invention depends on the observation of relative phase difference and hence neither the amplitude of the carrier nor the depth of modulation are directly relevant, the observation of phase difference is facilitated if the waves to be compared are of equal amplitude. It is therefore in general advantageous to operate the various beacon system aerials in such manner that they give rise to equal high-frequency fields and have the same depth of modulation. When angular velocity modulation is used there is an additional advantage in using the same depth of modulation (i. e. the same frequency or phase excursion) in that this will facilitate the most effective use of the receiver bandwidth.

The invention will be better understood from the following description of two practical embodiments of the invention, illustrated diagrammatically in the accompanying drawings, in which:

Figure 1 is a block diagrammatic representation of a radio course beacon system in accordance with the invention;

Figure 2 is a block diagrammatic representation of a radio receiver and indicator system for use in conjunction with the course beacon system of Figure 1;

Figure 3 is a block diagrammatic representation of an omnidirection radio beacon system in accordance with the invention;

Figure 4 is a block diagrammatic representation of a radio receiver and indicator system for use in conjunction with the omnidirectional beacon of Figure 3;

Figures 5, 6 and 7 are diagrams used in explaining the operation of the beacon and associated receiver illustrated respectively in Figures 3 and 4. Referring now to Figure 1, this represents in block diagrammatic form a three-aerial course beacon which constitutes an embodiment of the invention. Two of the aerials, A and C, are used to radiate a carrier modulated at 500 kc./s. (modulation wavelength 600 metres), giving at the receiver a signal wave having a characteristic which is a function of the direction of propagation; these two aerials are spaced apart preferably somewhat less than a wavelength of the modulation frequency, the spacing being therefore of the order of 600 metres irrespective of the radiated carrier wavelength. Aerial B is located in line with and substantially midway between aerials A and C, and is used to radiate a "sense" or reference signal on the same carrier frequency as is used by aerials A and C, but modulated at 250 kc./s. instead of 500 kc./s. These aerials are energised in the repeated sequence ABCABC..., the periods of energisation being substantially equal for aerials A and C, while that of B is conveniently made the same as for A and C. The course line is normal to the plane containing A, B and C.

Still referring to Figure 1, reference 1 represents a source of carrier power operating at for example 100 megacycles. Reference 2 represents a frequency modulator of known type in which the carrier power is modulated over a band of say ±1 megacycle either at what may be called the beacon I. F. frequency of 500 kc./s., obtained from modulating source 3, or at 250 kc./s., which is a subharmonic of the beacon I. F. frequency and is obtained from source 4. These sources of modulating frequency are locked together, as indicated by dotted line 21, so as to maintain a fixed phase relationship; for example, the 250 kc./s. source 4 may be excited from the 500 kc./s. source 3 through a frequency divider, or alternately the 500 kc./s. may be obtained from the 250 kc./s. by frequency doubling; or again, both tones may be obtained by different amounts of frequency multiplication or division from a common oscillator. The modulated output from 2 is taken over transmission lines 6, 7 and 8 to carrier frequency amplifiers 18, 19, 20 which in turn energise the aerials. The lengths of the transmission lines are made such that the propagation periods of lines 7 and 8 are respectively 0.5 microsecond and 1.5 microseconds longer than the propagation period of line 6, these delays corresponding respectively to 90° and 270° phase delay at the beacon I. F. frequency of 500 kc./s. Reference numeral 5 designates a three-phase commutator system which controls (keys) the operation of modulators 3 and 4 and the amplifiers 18, 19, 20. This commutator performs in sequence the following sets of operations. (a) In its first phase it operates over conductors 9, 11 to energise amplifier 19, enabling the latter to energise aerial A, and simultaneously operates over conductors 9, 10 to apply 500 kc./s. output from modulation source 3 to modulator 2; at the end of the phase both amplifier 19 and modulation source 3 are rendered inoperative. (b) In its second phase the commutator system operates over conductors 12, 14 to energise amplifier 18, and hence aerial B, and simultaneously operates over conductor 12, 13 to apply 250 kc./s. output from modulation source 4 to modulator 2; at the end of the phase both amplifier 18 and modulation source 3 are rendered inoperative. (c) In its third phase the commutator system operates over conductors 15, 17 to energise amplifier 20 and hence aerial C, and simultaneously operates over conductors 15, 16 to apply 500 kc./s. output from modulation source 3 to modulator 2, both amplifier and modulation source being rendered inoperative at the end of the phase. This sequence is then cyclically repeated in the same order in the present embodiment at a frequency of 3 kc./s. Any type of commutative control system which will perform at the required speed the functions described above may be used. For example, for slow speed switching the system may comprise a mechanical switch rotated continuously over a succession of contacts through which relay circuits in the amplifiers and modulation frequency sources may be opened or closed, the relays in turn performing the actual switching operations required in the individual apparatus units. For high speed switching a preferred electronic commutative system comprises a three-phase pulse generator, delivering square wave pulses which are applied to block or unblock the various amplifiers and modulation sources as required. With such a system the cyclicity of commutation may be sufficiently high to permit of additional modulation being applied during the period when the sense aerial B is energised, such additional modulation serving for the purpose of the transmission of beacon station identification signals and/or a telephony, and being received simultaneously with the directional course indications.

The aerials A, B and C may be given some degree of directivity along the course so as to confine the radiation within the useful zone and so to reduce the area from which reflections might occur.

Referring now to Figure 2, which illustrates in block diagrammatic form a radio receiver and course indicator system suitable for use in conjunction with the beacon transmitter system of Figure 1, the beacon signal waves are picked up in aerial D, which is preferably omnidirectional, amplified in high frequency amplifier 31 and then frequency-shifted by mixer 32 and beating oscillator 42 to the "receiver intermediate frequency" which may in the present instance be approximately 20 megacycles. After the frequency-shifting process the received wave is further amplified in the receiver intermediate frequency amplifier 33, and is then applied through limiter 34, to discriminator 35, the output of which contains trains of oscillations of frequency 500 kc./s. or 250 kc./s. corresponding to the modulations carried by the radiations from aerials A, B, C of Figure 1. The discriminator output is fed over conductor 36 to two parallel paths. In one path the 500 kc./s. output is selected by filter 37 and then frequency shifted by mixer 38 and beating oscillator 43, which has a frequency of 500.2 kc./s. to yield a wave having a strong 200 c./s. component the phase of which corresponds to the mean of the phases of the 500 kc./s. wave trains obtained by demodulation of the signals received, from aerials A and C, and is thus dependent on the bearing of the receiver relative to these two aerials. In the other path the 250 kc./s. output from discriminator 35 is selected by filter 39, raised to 500 kc./s. by frequency doubler 40, and then frequency-shifted by mixer 41 and beating oscillator 43 to yield a wave having a strong 200 c./s. component, the phase of which corresponds to the phase of the 250 kc./s. wave trains obtained by demodulation of the signals received from aerial B, and is therefore independent of the bearing of the receiver. These two outputs each of frequency 200 c./s. are fed respectively to the two coils of a dynamometer type of left-right indicator 44, the needle of which takes up a position depending on the product of the in-phase components of the two energising waves. When the receiver is "on course" the modulation phases of the signals received from aerials A and C are equally displaced, by virtue of the relative time delays in the transmission lines 6, 7, 8 of Figure 1, on either side of the modulation-phase corresponding to the signals received from sense-aerial B, and the indicator is energised in one winding by a current the phase of which corresponds to the mean phase of aerials A and C, while the other winding is energised by a current corresponding to the same phase as the said mean phase but derived from aerial B; the meter currents are thus fully in phase, and the needle assumes the "on course" position. When the receiver is located "off course," the modulation-phases of the signals received from A and C are displaced together in one direction or the other relative to the modulation-phase corresponding to the signals received from aerial B; the mean phase of the 200 c./s. wave derived mixer 38 is therefore advanced or retarded relative to the phase of the 200 c./s. wave derived from mixer 41, and the meter currents are no longer co-phased; the indicator accordingly deviates either to the right or to the left if its "on course" position according to the sense of the mean phase displacement referred to above, i. e. according to that side of the course on which the receiver may be located.

For the purpose of stabilising the course line in the desired direction a monitoring receiver may be mounted at some convenient position on the course, and any output from this receiver indicating that the course line is not in correct alignment may be applied to modify the intervals during which the beacon aerials A and C are energised, or otherwise modify the conditions so as automatically to correct the alignment.

In Figure 3 there is illustrated in block diagrammatic form an omnidirectional beacon constituting an embodiment of the invention. This beacon uses five omnidirectional aerials P, Q, R, S, and X. In order to simplify this diagram these aerials are shown arranged in line, but in the actual construction of the beacon the aerials are not in line but arranged as shown in Figure 6, with P, Q, R, and S at the respective corners of a square, P and R forming one diagonal pair and Q and S a second diagonal pair, while X is at the centre of the said square. As in the previous case, the spacing of the aerials is governed by the modulation frequency (wavelength), the diagonal of the square being substantially one-fifth the modulation wavelength e. g. for a modulation frequency of 500 kc./s. modulation wavelength 600 metres, the length of the diagonal is approximately 120 metres. All the aerials are energised at the same frequency, in the present instance 120 megacycles/sec., modulated at 500 kc./s. in the case of the aerials P, Q, R and S which mark the corners of a square, and modulated at 250 kc./s. in the centre of the aerial X which is at the centre of the square, and which is in effect a "sense" aerial, the phases of the 500 kc./s. and 250 kc./s. modulation sources being interlocked as hereinbefore described in connection with the course beacon illustrated in Figure 1.

Referring again to Figure 3, reference 51 indicates a master oscillator operating at a frequency of 15 mc./s., the output of which is fed to phase modulator 52, wherein it may be modulated, if so required, by a low frequency message channel indicated by 73, for example by a telephone channel. The modulated output from 52 then divides over two circuits correspondingly respectively to the sense aerial X and the direction indicating aerial group P, Q, R and S. Taking first the sense aerial system, the output from 52 is fed to another phase modulator 56, in which it is modulated, by a 250 kc./s. wave supplied by modulation source 53, over a phase excursion of ±45°, and then passes through frequency doublers indicated by reference 58, 59 and 60 to energise aerial X at a carrier frequency of 120 mc./s. Frequency doubler 60 is electronically controlled by one phase of a five-phase commutation 72 in such fashion that aerial X is energised in a succession of periods of about 200 microseconds repeated at the rate of 1600 per second.

The other branch of the output from phase modulator 52 is fed first to frequency doubler 55 and then to phase modulator 57, in which it is modulated over a phase excursion of ±45° by a 500 kc./s. wave derived from the 250 kc./s. modulation source 53 through frequency doubler 54. The modulated output from phase modulation 57 is then fed over from separate paths to the respective aerials P, Q, R and S. In the case of aerial P the path comprises a frequency doubler 64 followed by normally blocked electronically keyed or switched frequency doubler 68, the output carrier frequency being 120 mc./s. The paths to aerials Q, R and S comprise frequency doublers 65, 66 and 67 followed respectively by normally blocked electronically keyed or switched frequency doublers 69, 70 and 71, being in this respect similar to the path to aerial P; but in addition each path includes a delay network which may be a transmission line, such that the phases of energisation of aerials Q, R and S are delayed with respect to the phase of energisation of aerial P by intervals of ½, 1 and 1½ microseconds respectively, these intervals corresponding to angular phase differences of 90°, 180° and 270° at the modulation frequency of 500 kc./s. The electronically controlled frequency doublers 68, 69, 70 and 71 are controlled by separate phases of the five-phase commutator 72 (which also controls the frequency doubler 60 through which the sense aerial X is energised as already explained) in such fashion that the aerials P, Q, R, S are energised in turn, each for a period of 100 microseconds, at the rate of 1600 periods per second, the sequence of energisation of all five aerials being PQRSXPQRSX. . . . The five phase commutator 72 is a five-phase pulse generator of known type delivering square wave pulses of the required duration, repetition frequency, and phase at each of five output terminals, these pulses being applied to unblock in the desired sequence the frequency doublers through which the aerials are energised. The frequency of commutation is approximately 1600 cycles/sec., and aerials P, Q, R and S are each energised in turn for 100 microseconds, and sense aerial X for the remaining 200 microseconds of a commutation period; the beacon system is therefore radiating substantially continuously, from one aerial or another, and any message channel modulation which may be applied at modulator 52, common to all the aerial circuits, may be received with negligible interference arising from the commutation process.

In the embodiment now being described the operative period of the sense aerial is made twice as long as the operative period of any of the other aerials in order to ensure at the receiver a good signal/noise for the important sense signal. Since the receiver, as described hereinafter, includes a limiter, the signal/noise ratio is governed by the duration of the signal rather than by its amplitude. The other four aerials, which together yield the "directional" signal, are in operation for a longer period than the sense aerial, but in general give a weaker net signal since this net signal is derived from signal elements which are never in full phase coincidence.

Figure 4 shows a receiving and indicating system suitable for use in conjunction with the omnidirectional beacon previously described with reference to Figure 3. In this arrangement the 120 mc./s. beacon signals are received on aerial Y, which is preferably non-directive, amplified in high frequency amplifier 81, changed to the receiver intermediate frequency, which may be of the order of 20 mc./s., in frequency changer 82 which comprises the usual mixer, oscillator, and filter apparatus amplified in receiver I. F. amplifier 83, and then after limiting in limiter 84 to remove any amplitude modulation which may arise at the beacon itself or by interference, applied to frequency discriminator 85. The output of frequency discriminator 85 contains (a) a demodulation product corresponding to any "message" modulation which may have been applied to the beacon system as hereinbefore described; (b) a set of trains of 250 kc./s. waves, the trains having duration period 200 microseconds and repetition period 600 microseconds, corresponding to the 250 kc./s. modulation of the carrier wave received during the periods of energisation of beacon sense aerial X; and (c) four sets of trains of 500 kc./s. waves, the trains of each set having duration period 100 microseconds and repetition period 600 microseconds, each set corresponding to the modulation of the carrier waves received during the respective periods of energisation of beacon aerials P, Q, R and S. The "message" demodulation product is selected by low pass filter 88 and then applied to an appropriate utilisation device, such as head receivers when the message is in speech form. The 250 kc./s. and 500 kc./s. waves are subjected to further operations as follows.

The 250 kc./c. waves are first selected by filter 86 and then applied to frequency doubler 89, the output of which consists of a set of wave trains having train duration and repetition periods as for the input wave, but each train comprising cycles of a 500 kc./s. wave instead of 250 kc./c. This output is then beaten in mixer 92 against a wave of frequency 500.1 kc./s. generated in a stable frequency oscillator 93, the frequency of which may be stabilised if necessary by means such as a quartz crystal in accordance with known technique. The mixer output is applied to 100 c. p. s. low pass filter 95, at the output of which is obtained a wave of frequency 100 c./s. and of phase determined by the phase of the 250 kc./s. modulation of the received carrier. Since this modulation is received on the radiation from only one of the beacon aerials, i. e. the sense aerial X, its phase is independent of the direction of propagation, and the phase of the derived 100 c./s. wave is therefore suitable for use as a reference phase. The output from filter 95 is fed to the moving coil 99 of dynamometer phasemeter 98.

For a more detailed explanation of how the 100 c./s. wave is derived, reference may be made to Fig. 5. It is well known that if two uninterrupted waves of different frequencies are applied to an amplitude demodulator, there will be obtained an output wave of frequency equal to the beat frequency or difference between the frequencies of the input waves, and that any change in the phase of either of the input waves results in an equal change in the phase of the said output wave of beat frequency. Curve 110 of Fig. 5 shows the instantaneous amplitude of the beat wave which would be obtained at the output of mixer 92 if the beacon commutator were removed and the beacon sense aerial X maintained continuously energised. This beat wave has a frequency of 100 c./s., period 10,000 microseconds. With the commutator in action, however, the mixer output instead of varying continuously as shown by curve 110, consists of a series of short pulses as shown at k, Fig. 5, these pulses being of uniform duration, 200 microseconds, and uniform spacing, 400 microseconds, but of variable amplitude, the amplitude of any particular pulse being identical to the amplitude given by curve 110 during the time occupied by that particular pulse. On applying this complex interrupted or pulse wave to filter 95, which passes 100 c./s. but cuts off below 200 c./s., there is obtained a continuous wave, the instantaneous amplitude of which is proportional to the envelope of the pulse amplitudes, i. e. a continuous wave of the same frequency and phase as would be given in the absence of commutation. The amplitude of the filter output wave is however reduced relative to that obtainable in the absence of commutation in the ratio of approximately the pulse duration to the pulse repetition period, in the present case the ratio of 200 microseconds to 600 microseconds, giving the continuous wave 111 shown in Fig. 5. Such extraction of a continuous wave of envelope frequency and phase from a train of pulses is well known in connection with pulse communication systems.

Referring again to Fig. 4, the 500 kc./s. waves in the output of discriminator 85 are selected by filter 87 and then fed to two mixers 90 and 91, in which they are beaten against a wave of frequency 500.1 kc./s. supplied by oscillator 93 to give waves of frequency 100 c./s. which are selected by filters 96 and 97 and then applied respectively to the fixed fields coils 100 and 101 of dynamometer phasemeter 98. The 100 c. p. s. waves derived from the two mixers 90 and 91 differ in phase by 90°, this difference being obtained by the introduction of a 90° phase shifter, ref. 94, in the 500.1 kc./s. supply to demodulator 91. Dynamometer phasemeter 98 thus has its fixed coils energised at 100 c. p. s. by two currents both derived from the 500 kc./s. modulation, which is received from the beacon aerials P, Q, R and S, while the movable coil is energised by current of the same frequency as for the fixed coils, 100 c. p. s., but derived from the 250 kc./s. modulation received from the beacon sense aerial. The meter accordingly takes up a position corresponding to the phase difference between the 100 c./s. moving coil current and the 100 c./s. field coil currents both of which are derived from 500 kc./s. waves which are phase interlocked, having common origin in the 250 kc./s. modulation source 53 of Fig. 3. The 500 kc./s. wave from which the phasemeter moving coil current is derived is obtained from the 250 kc./s. modulation source wave by the steps of modulation in modulator 36 of Fig. 3, propagation from beacon sense aerial X to receiver aerial Y, demodulation in demodulator 85 of Fig. 4, and finally frequency doubling in doubler 89 of Fig. 4. The 500 kc./s. wave from which the phasemeter field current(s) is derived is obtained from the same 250 kc./s. modulation source wave by the steps of frequency doubling in doubler 54 of Fig. 3, modulation in modulator 57 of Fig. 3, propagation from the spatially distributed beacon aerials P, Q, R and S to receiver aerial Y, and finall demodulation in demodulator 85 of Fig. 4. The phase difference to which the meter responds is therefore determined by the variable factor in the two conversion systems from 250 kc./s. to 100 c./s., this variable factor being a function of the propagation paths, and the meter reading yields the bearing angle of the receiver relative to the beacon as hereinafter explained.

It is important to note that the input to mixer 90 from filter 87 consists of four sets of trains of 500 kc./s. waves, corresponding to the modulations received respectively and in sequence from beacon aerials P, Q, R and S. Since these aerials are differently located in space, the phases of the modulations received therefrom via the single receiving aerial Y are also different. Each set of 500 kc./s. waves gives rise to a corresponding set of pulses at the output of demodulator 93, these pulses in turn giving rise, in the manner already described, to a continuous 100 c./s. wave at the output of filter 96, the phase of this wave corresponding to the phase of the set of 500 kc./s. wave trains from which it is ultimately derived. The total output of filter 96 thus comprises four superposed 100 c./s. waves, the phases of which correspond respectively to the phases of the modulations received from the four beacon aerials P, Q, R and S, each of these four waves being continuous despite the intermittent energisation of the said aerials through the functioning of the phase commutator 72 controlling the frequency doublers which feed the aerials. Similar conditions arise at the output of filter 97, at which point four other superposed continuous 100 c./s. waves are producing, each wave differing in phase by 90° from the corresponding wave at the output of filter 96. Since the waves are all of the same frequency they can of course be added vectorially to give at the respective filter outputs two summation waves diffusing in phase by 90°, but otherwise identical, care being taken to equalise the gains in the two paths 90—100 and 91—101.

It should also be noted that since the only object of the chain of apparatus comprising mixer 91, phase shifter 94, and filter 97 to supply a wave in quadrature with that obtained from filter 96, but otherwise identical therewith, this chain of apparatus might be removed, and the quadrature supply for meter coil 101 obtained from the 100 c./s. output of filter 96 by phase-splitting means well known to the art. Such phase-splitting means are, however, dependent on the stability of the operative frequency, and their use would impose highly stringent frequency stability requirements on the beacon modulation source 53 as well as on the receiver beating oscillator 93. With the arrangement shown in Fig. 4, variations of the frequency of the beacon modulation sources do not affect the production of the required 90° phase shift, since this depends solely on the phase shifter 94 which is operative at the frequency of the receiver beating oscillator 93, and a small change in the frequency of this oscillator, which might make a relatively large change in the beat frequency, will make little difference in the phase of the voltage actually fed to mixer 91.

The relative phasing of the four continuous 100 c./s. waves derived as hereinbefore explained will depend upon the difference in the modulation phasing at the corresponding transmitting aerials, and on the differences between the path lengths from the said transmitting aerials to the receiving aerial. Referring now to Fig. 6, in which the dimension L is half the diagonal of the aerial square, it will be seen that for a receiving aerial located at a point O sufficiently distant from the beacon system for the bearing angle from O to each of the beacon aerials to have substantially the same value $a$, where $a$ is the bearing angle relative to the direction through one diagonal SXQ of the beacon aerial system, the path differences arising from the spatial disposition of the aerials will give rise to phase differences, relative to a reference wave originating at X, as follows.

Writing the wavelength of the modulation frequency as $\lambda_F$, the wave due to radiation from P will be advanced by an angle $$\frac{360° \, Yp}{\lambda_F} = \frac{360° \, L \sin \alpha}{\lambda_F}$$

the wave due to radiation from Q will be advanced by an angle $$\frac{360° \, Yq}{\lambda_F} = \frac{360° \, L \cos \alpha}{\lambda_F}$$

the wave due to radiation from R will be retarded by $$\frac{360° \, Yr}{\lambda_F} = \frac{360° \, L \sin \alpha}{\lambda_F}$$

and the wave due to radiation from aerial S will be retarded by $$\frac{360° \, Ys}{\lambda_F} = \frac{360° \, L \cos \alpha}{\lambda_F}$$

To these phase differences must be added the phase retardations imposed, as explained in connection with Fig. 3, by the delay devices 61, 62 and 63 in the circuits feeding aerials Q, R and S, these retardations amounting respectively to 90°, 180°, and 270°. The overall relative phasing of the modulations received from the four aerials is therefore as follows:

$$\text{Aerial P:} \frac{360° \, L \sin \alpha}{\lambda_F}$$

$$\text{Aerial Q:} \frac{360° \, L \cos \alpha}{\lambda_F} - 90°$$

$$\text{Aerial R:} \frac{-360° \, L \sin \alpha}{\lambda_F} - 180°$$

$$\text{Aerial S:} \frac{-360° \, L \cos \alpha}{\lambda_F} - 270°$$

The output of filter 96, Fig. 4, is therefore the vector sum of four 100 c./s. waves, of equal amplitudes (since all four aerials P, Q, R and S are equally energised) but phased in accordance with the overall modulation phasing given above. These four waves are represented vectorially in Fig. 7 as the vectors designated $v$P, $v$Q, $v$R and $v$S, the final letter of the designation corresponding to the aerial associated with the particular vector.

These phase relationships are such that the vectors can be conveniently handled in pairs. The vectors $v$P and $v$R add together to give a vector the phase of which is constant at 90°, while the amplitude varies with the bearing angle and is given by $$2 \sin \frac{360° \, L \sin \alpha}{\lambda_F}$$

as indicated in Fig. 7 by the vector designated U. Similarly, the vectors $v$Q and $v$S add together to give a vector the phase of which is constant at 0°, while the amplitude varies with the bearing angle $a$ and is given by $$2 \sin \frac{360° \ L \cos \alpha}{\lambda_F}$$

this summation vector is indicated in Fig. 7 by the vector designated V. The sum total of the four vectors, illustrated in Fig. 7 by the vector designated W, has phase angle $\beta$, where $$\beta = \tan^{-1} \frac{\sin \frac{360° \ L \sin \alpha}{\lambda_F}}{\sin \frac{360° \ L \cos \alpha}{\lambda_F}}$$

Thus the phase angle $\beta$ of the net 100 c./s. output from filter 96 (Fig. 4) varies progressively round the beacon. If $$\frac{L}{\lambda_F}$$

is of the order of one-tenth or less it becomes permissible to use the approximation $\sin x = x$, and the expression for $\beta$ may then be simplified to $$\beta = \tan^{-1} \frac{\frac{360° \ L \sin \alpha}{\lambda_F}}{\frac{360° \ L \cos \alpha}{\lambda_F}}$$

$$= \tan^{-1} \tan \alpha$$

i. e. the phase angle of the 100 c. p. s. wave is the same as the bearing angle of the receiver relative to the direction SXQ, the vectors U and V combining to give a vector W of substantially constant amplitude and phase angle substantially equal to $\alpha$ for all values of $\alpha$. Phasemeter 98 will therefore register directly the bearing angle of the receiver relative to the beacon.

It will be evident that the output of filter 97, Fig. 4, will be identical with that from filter 96 as explained in the preceding paragraph, apart from a fixed phase shift of 90° due to the introduction of the phase shifter 94 in the beating oscillator supply to mixer 91. The actual phase of the beating oscillator 98 is of no importance, as it affects both demodulators in the same way and does not introduce any differential shift in the phases at the outputs of filters 96 and 97.

It will also be appreciated that any differential phase shift of modulation frequency currents which may occur in the beacon apparatus or in the receiver will result merely in a fixed error in the directional indication. Such an error may be overcome by simply adjusting the position of the meter scale; or by introducing a differential phase shift, in the opposite sense to the error, in the phasemeter moving coil circuit, or preferably in the beating oscillator supply to mixer 92.

While various apparatus units such as oscillators, modulators, frequency discriminators, filters, doublers, mixers and the like have been referred to in the foregoing descriptions of embodiments of the invention, no details have been given of their construction, since they are all well known in the art, and the present invention does not require any special features in the construction of such units. It is to be understood that in the case of frequency doublers and other translating devices the presence of amplification in addition to the named function is not excluded.

What is claimed is:

1. A radio beacon transmitter system comprising a plurality of spaced aerials, means for feeding each of said aerials with energy of the same high frequency, means for modulating in predetermined frequency and phase the energy fed to respective ones of said aerials in such manner as to set up polar patterns of phase difference between the envelopes of modulation, a separate electronically controlled thermionic valve device for each one of the said aerials which normally blocks the energy feed to each aerial, a polyphase square wave generator having a plurality of successively and cyclically energized phases, and means responsive to each of said energized phases for unblocking said normally blocked thermionic valve device to render said aerials successively operative for respective non-overlapping periods in a cyclically repeated sequence of operation.

2. A radio beacon transmitter system comprising a plurality of spaced aerials, means for feeding each of said aerials with high frequency energy, a modulator for modulating in predetermined frequency and phase the energy fed to respective ones of said aerials in such manner as to set up polar patterns of phase difference between the envelopes of modulation, and commutative means to control the operation of each of said aerials in such manner that the said aerials are rendered successively operative for respective non-overlapping periods in a cyclically repeated sequence of operation, said commutative means also controlling modulation waves applied to said common modulator.

3. A radio beacon transmitter system comprising a plurality of spaced aerials, means for feeding each of the said aerials with high frequency energy, means for modulating in predetermined frequency and phase the energy fed to respective ones of said aerials in such manner as to set up polar patterns of phase difference between the envelopes of modulation, commutative means to control the operation of each of said aerials in such manner that said aerials are rendered successively operative for respective non-overlapping periods in a cyclically repeated sequence of operation, the interval between the periods of energization of any two successively energized aerials being substantially zero.

4. A radio beacon transmitter system according to claim 1, in which said thermionic valve device is an amplifier.

5. A radio beacon transmitter system according to claim 1, in which thermionic valve device is a frequency multiplier.

6. A radio course beacon transmitter system comprising three aerials arranged in line with uniform spacing, and commutator means for feeding said aerials successively and for non-overlapping periods cyclically with frequency-modulated high frequency energy, the energies fed to respective outer ones of said aerials being modulated by waves of the same frequency $f$ but with opposite phases of modulation, the energy fed to the centre one of said aerials being modulated by a wave of frequency $f/n$, where $n$ is an integer other than unity in such phase that the wave of frequency $f$ produced by frequency-multiplying by $n$ the said modulation wave of frequency $f/n$ would be substantially in phase quadrature with the said modulation waves of frequency $f$, and the spacing between the centre aerial and each of said outer aerials being substantially one half of the wavelength of modulation of said outer aerials, the periods of energisation of said outer aerials being substantially equal, and the period of energisation of said centre aerial being of the same order as said substantially equal periods.

7. A radio course beacon transmitter system according to claim 6, wherein said aerials are directive aerials and are arranged to concentrate their radiation within the azimuth angle to be served by the beacon.

8. An omnidirectional radio beacon transmitter system comprising four aerials located at the corners of a square and a fifth or sense aerial located at the centre of said square, means for feeding said five aerials successively and cyclically for non-overlapping periods with phase-modulated high frequency energy, the energies fed to respective ones of said corner aerials being modulated by waves of the same frequency $f$ but of phases such that diagonally opposite aerials have their modulation-phases in opposition while adjacent aerials have their modulation-phases in quadrature relationship, the energy fed to the said centre aerial being modulated by a wave of frequency $f/n$, where $n$ is an integer other than unity, in such phase that the wave produced by frequency-multiplying by $n$ the said wave of frequency $f/n$ would be substantially in phase coincidence with the modulation phase of a given one of said corner aerials, the diagonal of said square being of the order of one-fifth of the wavelength of modulation of said corner aerials, the periods of energisation of said corner aerials being substantially equal, and the period of energisation of said centre aerial being greater than that of a corner aerial.

9. An omnidirectional radio beacon transmitter system according to claim 8, in which the period of energisation of said centre aerial is substantially twice that of a corner aerial.

10. A radio beacon transmitter system according to claim 3, further comprising an additional modulator operative on all the energy fed to said plurality of aerials, and means to apply message signals to said additional modulator, and in which the shortest period of energisation of any of said aerials is not greater than substantially one third the period of the highest frequency component of said message signals.

11. A radio course beacon transmitter system according to claim 6, further comprising means for modulating the energy fed to said centre aerial by message signals, and in which the frequency of said cyclically operative commutator means is not less than substantially three times that of the highest frequency component of said message signals.

12. A radio course beacon receiver system comprising receiver means for receiving frequency-modulated electromagnetic waves, means for limiting and demodulating said received waves, filter means for selecting a demodulation product of predetermined frequency $f$, a beating oscillator, first mixer means wherein said demodulation product of frequency $f$ is beaten against said beating oscillator, to yield a first wave of frequency F, filter means for selecting a demodulation product of predetermined frequency $f/n$, where $n$ is an integer other than unity, frequency multiplier means for deriving a wave of frequency $f$ from said demodulation product of frequency $f/n$, second mixer means wherein said derived wave of frequency $f$ is beaten against said beating oscillator to yield a second wave of frequency F, a dynamometer type left-right course indicator, and means for applying said first and second waves of frequency F to respective windings of said indicator.

13. A radio omnidirectional beacon receiver system comprising means for receiving phase modulated electromagnetic waves, means for limiting and demodulating said received waves, filter means for selecting demodulation products of predetermined frequency $f$, a beating oscillator of frequency differing from $f$ by F, first mixer means wherein at least part of the output of said filter means for selecting demodulation products of frequency $f$ is beaten against said beating oscillator to yield a first difference-frequency wave, filter means to select from said first difference-frequency wave a first wave of frequency F the phase of which is a function of the bearing of said receiver relative to the source of said electromagnetic waves, means for obtaining a second wave of frequency F in phase quadrature with said first wave of frequency F but otherwise identical, a dynamometer phasemeter, means for applying said first and second waves of frequency F to respective fixed coils of said phasemeter, filter means for selecting demodulation products of frequency $f/n$ where $n$ is an integer other than unity, frequency multiplier means for deriving a wave of frequency $f$ from said demodulation products of frequency $f/n$, second mixer means wherein said derived wave of frequency $f$ is beaten against said beating oscillator to yield a second difference-frequency wave, filter means to select from said second difference-frequency wave a third wave of frequency F and of reference phase, and means for applying said third wave of frequency F to the moving coil of said phasemeter, whereby said moving coil assumes a position indicative of said bearing of the receiver.

14. A radio omnidirectional beacon receiving system according to claim 13, in which said means for obtaining said second wave of frequency F comprises a phase-shifting device having a phase shift of substantially 90° at the frequency of said beating oscillator, a third mixer means wherein part of the output of said filter means for selecting demodulation products of frequency $f$ is beaten against a wave derived from said beating oscillator through said phase-shifting device, and filter means to select from the output of said third mixer the said second wave of frequency F.

CHARLES WILLIAM EARP.
CHARLES ERIC STRONG.

REFERENCES CITED

The following references are of record in the file of this patent:

UNITED STATES PATENTS

| Number | Name | Date |
|---|---|---|
| 1,406,996 | Morrill | Feb. 21, 1922 |
| 1,919,556 | Jacquemin | July 25, 1933 |
| 2,144,203 | Shanklin | Jan. 17, 1939 |
| 2,198,113 | Holmes | Apr. 23, 1940 |
| 2,337,902 | Relson | June 12, 1945 |
| 2,381,181 | Price | Aug. 7, 1945 |
| 2,404,810 | O'Brien | July 30, 1946 |
| 2,408,773 | Goodall | Oct. 8, 1946 |
| 2,428,265 | Crosby | Sept. 30, 1947 |
| 2,440,755 | O'Brien | May 4, 1948 |
| 2,490,394 | Williams | Dec. 6, 1949 |
| 2,502,662 | Mitchell et al. | Apr. 4, 1950 |

FOREIGN PATENTS

| Number | Country | Date |
|---|---|---|
| 546,000 | Germany | Mar. 8, 1932 |